(12) United States Patent
Mani et al.

(10) Patent No.: US 12,174,311 B2
(45) Date of Patent: Dec. 24, 2024

(54) EMPTY BAND DOPPLER DIVISION MULTIPLE ACCESS

(71) Applicant: TEXAS INSTRUMENTS INCORPORATED, Dallas, TX (US)

(72) Inventors: Anil Varghese Mani, Bangalore (IN); Sandeep Rao, Bangalore (IN); Dan Wang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 437 days.

(21) Appl. No.: 17/466,867

(22) Filed: Sep. 3, 2021

(65) Prior Publication Data

US 2023/0072441 A1  Mar. 9, 2023

(51) Int. Cl.
*G01S 7/02* (2006.01)
*G01S 13/58* (2006.01)

(52) U.S. Cl.
CPC .......... *G01S 7/0232* (2021.05); *G01S 13/583* (2013.01)

(58) Field of Classification Search
CPC ............................. G01S 7/0232; G01S 13/583
See application file for complete search history.

(56) References Cited

U.S. PATENT DOCUMENTS

| | | | | |
|---|---|---|---|---|
| 8,059,026 | B1 * | 11/2011 | Nunez | G01S 13/0209 |
| | | | | 342/84 |
| 9,939,524 | B2 * | 4/2018 | Winstead | G01S 13/18 |
| 11,262,448 | B2 * | 3/2022 | Davis | G01S 7/0234 |
| 2018/0218228 | A1 * | 8/2018 | Takaki | G01S 13/867 |
| 2018/0255586 | A1 * | 9/2018 | Einhaus | H04L 5/00 |
| 2020/0209380 | A1 * | 7/2020 | Takayama | G01S 7/352 |
| 2020/0300965 | A1 * | 9/2020 | Wu | G01S 13/505 |
| 2021/0184723 | A1 * | 6/2021 | Brighenti | H04B 17/354 |
| 2022/0099837 | A1 * | 3/2022 | Crouch | G01S 17/931 |

FOREIGN PATENT DOCUMENTS

| | | | | | |
|---|---|---|---|---|---|
| CN | 110022176 | A | * | 7/2019 | |
| CN | 106538017 | B | * | 1/2020 | |
| CN | 112994813 | A | * | 6/2021 | .......... H04B 17/382 |
| JP | 55116284 | A | * | 9/1980 | |
| JP | 2023113910 | A | * | 8/2023 | |
| KR | 101042029 | B1 | * | 6/2011 | |
| WO | WO-2018202257 | A1 | * | 11/2018 | |

* cited by examiner

*Primary Examiner* — Vladimir Magloire
*Assistant Examiner* — Maxine McKenzie Phillips
(74) *Attorney, Agent, or Firm* — Michael T. Gabrik; Frank D. Cimino (57) ABSTRACT

In an example, a method is implemented in a radar system. The method may include transmitting, via transmission channels, a frame of chirps, the chirps transmitted having a programmed frequency offset that is a function of a transmission channel of the transmission channels that is transmitting the frame of chirps, receiving, via a receive channel, a frame of reflected chirps, the reflected chirps comprising the chirps reflected by an object within a field of view of the radar system, and determining a Doppler domain representation of the frame of reflected chirps having a Doppler domain spectrum that includes multiple spectrum bands, the object represented in at least a portion of the spectrum bands based on the reflected chirps, wherein the programmed frequency is configured to cause the Doppler domain spectrum to include a number of spectrum bands greater than the number of transmission channels.

18 Claims, 3 Drawing Sheets

EMPTY BAND DOPPLER DIVISION MULTIPLE ACCESS

CROSS-REFERENCE TO RELATED APPLICATIONS

The present application claims priority under 35 U.S.C. § 119 to U.S. Provisional Patent Application No. 62/888,653, which was filed Aug. 19, 2019, is titled "Modified 'Doppler Division Multiple Access' (OR DDMA) To Reduce Disambiguation Complexity And Improve Spectral Efficiency," and is hereby incorporated herein by reference in its entirety.

BACKGROUND

Doppler Division Multiple Access (DDMA) is a method of dividing a Doppler dimension or Doppler domain into multiple sub-divisions and assigning a transmitter to one such sub-division. This may be performed by generating a sequence of chirps such that there is a linear increment (or decrement) in the starting phase of each chirp. Different transmitters may have different rates of phase increment or decrement. For each chirp, multiple transmitters are enabled. When received and processed according to a two-dimensional fast Fourier transform (FFT), DDMA signals from different transmitters will each occupy different bands in the Doppler domain. In this way, DDMA facilitates the simultaneous use of multiple transmitters within a single chirp, but prevents them from interfering with each other in the Doppler domain, also providing a capability to separate data from each transmitter.

SUMMARY

Some aspects of the description provide for a method. The method may be implemented in a radar system. The method may include transmitting, via transmission channels, a frame of chirps, the chirps transmitted having a programmed frequency offset that is a function of a transmission channel of the transmission channels that is transmitting the frame of chirps, receiving, via a receive channel, a frame of reflected chirps, the reflected chirps comprising the chirps reflected by an object within a field of view of the radar system, and determining a Doppler domain representation of the frame of reflected chirps having a Doppler domain spectrum that includes multiple spectrum bands, the object represented in at least a portion of the spectrum bands based on the reflected chirps, wherein the programmed frequency is configured to cause the Doppler domain spectrum to include a number of spectrum bands greater than the number of transmission channels.

Some aspects of the description provide for a radar system. In some examples, the radar system includes a radar transceiver integrated circuit (IC). The radar transceiver IC may be configured to transmit, via multiple transmitters, frames of chirps, each frame of chirps transmitted by one of the multiple transmitters at a programmed frequency specific to the one of the multiple transmitters, receive frames of reflected chirps, the reflected chirps having been reflected by an object within a field of view of the radar system, determine a Doppler domain representation of the frame of reflected chirps having a Doppler domain spectrum that includes multiple spectrum bands, the object represented in at least a portion of the spectrum bands based on the reflected chirps, wherein the programmed frequency is configured to cause the Doppler domain spectrum to include an empty spectrum band, and perform velocity disambiguation of the object based on the Doppler domain spectrum.

Some aspects of the description provide for a radar system. In some examples, the radar system includes a radar transceiver integrated circuit (IC). The radar transceiver IC may be configured to transmit, via multiple transmitters, frames of chirps, each frame of chirps transmitted by one of the multiple transmitters at a programmed frequency specific to the one of the multiple transmitters, receive frames of reflected chirps, the reflected chirps having been reflected by an object within a field of view of the radar system, determine a Doppler domain representation of the frame of reflected chirps having a Doppler domain spectrum that includes multiple spectrum bands, the object represented in at least a portion of the spectrum bands based on the reflected chirps, wherein the programmed frequency is configured to cause the Doppler domain spectrum to include an empty spectrum band, and perform collision detection of the object based on the Doppler domain spectrum.

BRIEF DESCRIPTION OF THE DRAWINGS

For a detailed description of various examples, reference will now be made to the accompanying drawings in which.

DETAILED DESCRIPTION

DDMA is a radar transmit scheme that is increasingly popular but has some shortcomings, such as challenges related to velocity disambiguation and collisions. A collision occurs when two targets travelling at different velocities, but at the same range, are seen by the radar as a single object. In a DDMA system, multiple transmitters transmit together and a result of those transmissions (e.g., reflected signals) are analyzed in a Doppler domain. By controlling the transmitters to transmit at a frequency determined to cause an empty band to occur at an end of a spectrum in the Doppler domain, an ability to perform velocity disambiguation and collision detection may be increased. For example, if an object which reflects a signal transmitted by the transmitters has a velocity that exceeds a maximum velocity detectable by the DDMA system, the empty band may aid in identifying what a "true" velocity is of the object. Similarly, in the event of a collision, an object may be represented in each band of the spectrum in the Doppler domain. This may enable a processing device to have increased information when processing the object and may modify operation, such as by ignoring the collision affected object. In some examples, the empty band DDMA of this description may be implemented in conjunction with Doppler spectrum sharing approaches, such as Binary Phase Modulation.

Figure 1:
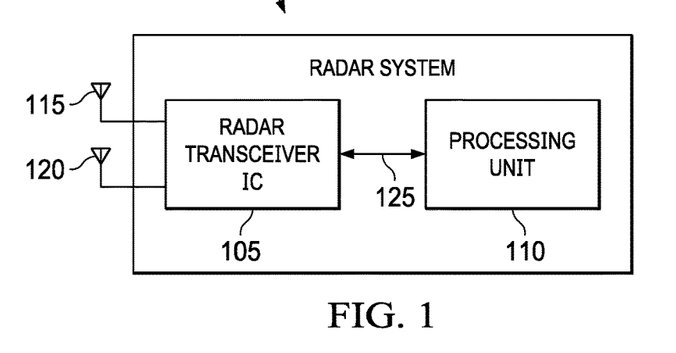
FIG. 1 shows a block diagram of an illustrative radar system in accordance with various examples.
Figure 3:
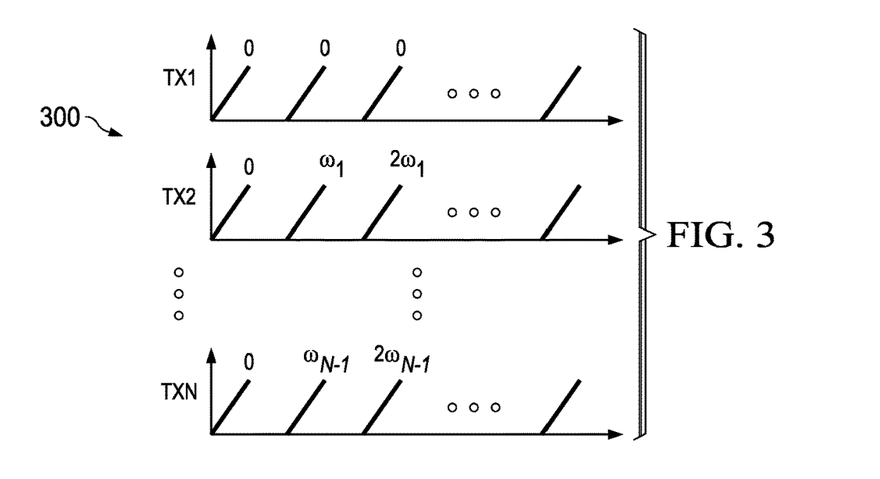
FIG. 3 shows a timing diagram of transmitted radar chirps in accordance with various examples.

FIG. 1 shows a block diagram of a radar system 100 in accordance with various examples. In at least one example, the radar system 100 includes a radar transceiver IC 105 and a processing unit 110. In some examples, the radar system 100 further includes a transmit antenna 115 and a receive antenna 120, while in other examples the radar system 100 does not include, but is adapted to be couples to, the transmit antenna 115 and the receive antenna 120. An illustrative architecture of the radar transceiver IC 105 is shown in FIG. 3 and described below.

In at least one example, the radar transceiver IC 105 may be referred to as the front end of the radar system 100 and the processing unit 110 may be referred to as the backend of the radar system 100. In at least one example, the radar transceiver IC 105 and the processing unit 110 are implemented separately and may be adapted to be to coupled together, while in other examples the radar transceiver IC 105 and the processing unit 110 are implemented together, for example, in a single chip package or on a system-on-chip (SoC) (e.g., a single IC). In examples where radar transceiver IC 105 and processing unit 110 are implemented on a SoC, the radar transceiver IC 105 may correspond to a sub-circuit of the IC that forms the SoC. In at least one example, the processing unit 110 is coupled to the radar transceiver IC 105 via an interface 125 that may facilitate any suitable communication method (e.g., serial interface or parallel interface) and is configured to receive data from and/or transmit data to the radar transceiver IC 105.

In at least one example, the interface 125 may be a high-speed serial interface such as a low-voltage differential signaling (LVDS) interface. In another example, the interface 125 may be lower speed interface such as a serial peripheral interface (SPI). In at least one example, the radar transceiver IC 105 includes functionality to generate one or more digital intermediate frequency (IF) signals (alternatively referred to as de-chirped signals, beat signals, or raw radar signals) from reflected chirps received via the receive antenna 120. Further, in at least one example, the radar transceiver IC 105 includes functionality to perform at least a portion of the signal processing of radar signals (e.g., the reflected chirps and/or the digital IF signals) received in the radar transceiver IC 105, and to provide the results of this signal processing to the processing unit 110 via the interface 125. In at least one example, the radar transceiver IC 105 performs a range FFT for each received frame (e.g., each sequence of chirps of the frame) of the radar transceiver IC 105. In at least some examples, the radar transceiver IC 105 also performs a Doppler FFT for each received frame of the radar transceiver IC 105 (e.g., after performing, and on a result of, the range FFTs).

In at least one example, the processing unit 110 includes functionality to process data received from the radar transceiver IC 105 to, for example, determine any one or more of a distance, velocity, and/or angle of any objects detected by the radar system 100. In some examples, the processing unit 110 may also, or alternatively, include functionality to perform post processing of information about the detected objects, such as tracking objects, determining rate and direction of movement, etc. In at least one example, the processing unit 110 performs velocity disambiguation and/ or collision detection, for example, according to aspects of the present description providing for an empty band at an end of the Doppler spectrum (e.g., output of the Doppler FFT performed on a received frame of the radar transceiver IC 105). In various examples, the processing unit 110 includes any one or more suitable processors or combinations of processors as needed for processing data received from the radar transceiver IC 105 and or providing data to the radar transceiver IC 105. For example, the processing unit 110 may include any one or more of a digital signal processor (DSP), a microcontroller, a SOC combining both DSP and microcontroller processing, a field-programmable gate array (FPGA), or any combination of the foregoing.

Figure 2:
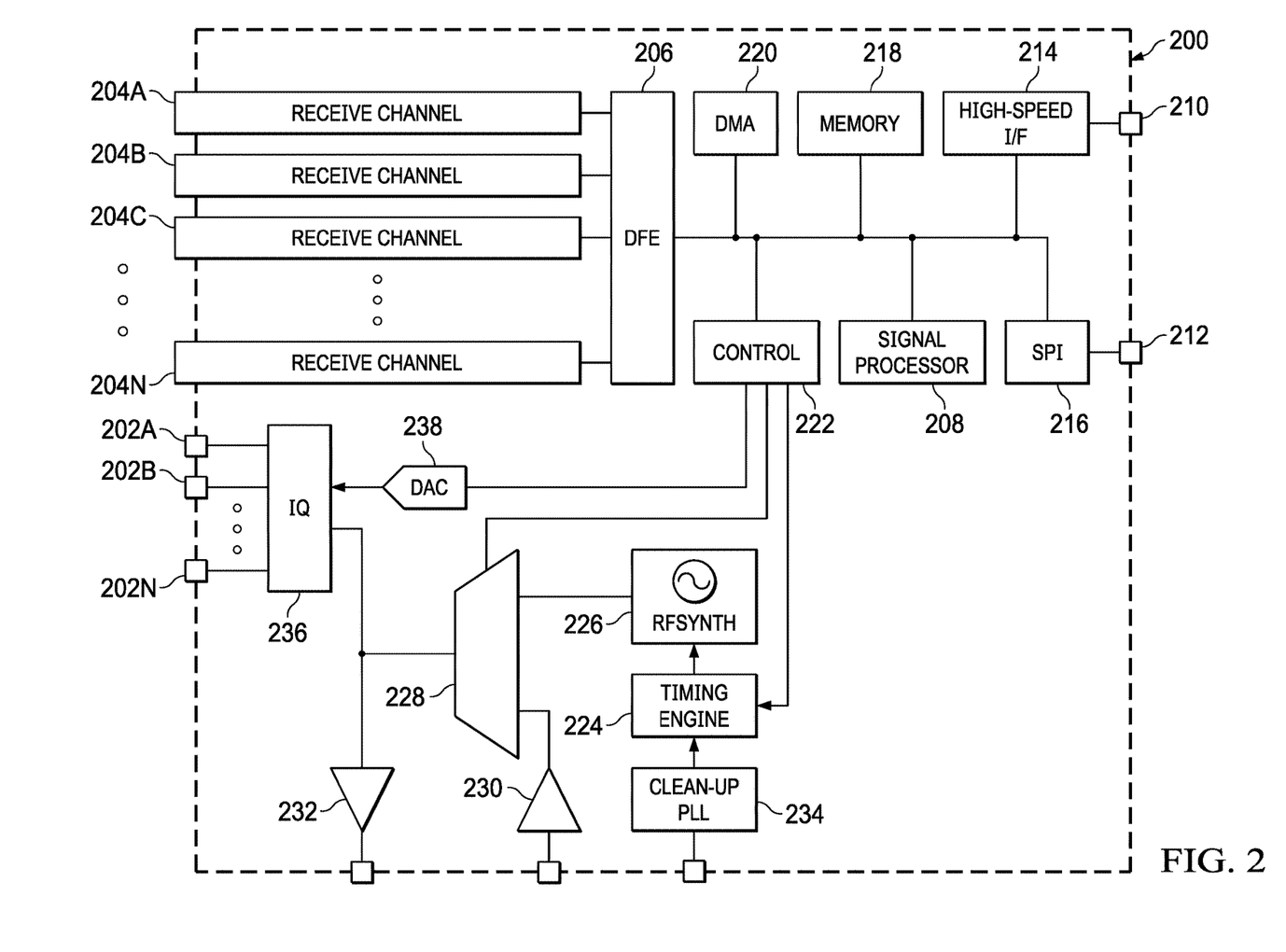
FIG. 2 shows a block diagram of an illustrative radar transceiver integrated circuit (IC) in accordance with various examples.

FIG. 2 is a block diagram of an example radar transceiver IC 200 in accordance with various examples. In at least some examples, the radar transceiver IC 200 is suitable for implementation as the radar transceiver IC 105 of the radar system 100 of FIG. 1. In other examples, the radar transceiver IC 200 is suitable for implementation in other radar systems. In at least one example, the radar transceiver IC 200 includes one or more transmit channels 202A-202N (where N is any positive integer) and one or more receive channels 204A-204M (where M is any positive integer). In at least one example, N may be 3 and M may be 4. Each of the transmit channels 202A-202N and the receive channels 204A-204M may be individually coupled to a transmit antenna or a receive antenna, respectively, such as a transmit antenna 115 or a receive antenna 120, as described above with respect to FIG. 1 and not shown in FIG. 2. Although shown for the sake of simplicity as including four receive channels (204A, 204B, 204C, 204M) and three transmit channels (202A, 202B, 202N), in various examples the radar transceiver IC 200 may include any suitable number of receive channels 204M and/or any suitable number of transmit channels 202N. Also, the number of receive channels 204M and the number of transmit channels 202N may be the same number or may be different numbers.

Each of the transmit channels 202N and/or the receive channels 204M may include any suitable circuitry, components, elements, or functionality consistent with any radar architecture capable of operating according to empty-band DDMA and the teachings herein. The scope of this circuitry, components, elements, or functionality of the transmit channels 202N and/or the receive channels 204M is not limited herein. In at least some examples, each transmit channel 202N may be substantially similar in hardware architecture and may couple to its own respective transmit antenna (not shown) or to the same transmit antenna. In at least some examples, each receive channel 204M may be substantially similar in hardware architecture and may couple to its own respective receive antenna (not shown) or to the same receive antenna.

In at least one example, each receive channel 204M may be coupled to a digital front end (DFE) 206, for example, to provide digital IF signals to the DFE 206. The DFE 206, which may also be referred to as a digital baseband, includes in at least one example, functionality to perform decimation filtering or other processing operations on the digital IF signals, for example, to reduce the data transfer rate of the digital IF signals. In various examples, the DFE 206 may also perform other operations on the digital IF signals such as direct current (DC) offset removal and/or compensation (e.g., digital compensation) of non-idealities in the receive channels 204M such as inter-receiver gain imbalance non-ideality, inter-receiver phase imbalance non-ideality, and the like. In at least one example, the DFE 206 is coupled to a signal processor 208 and configured to provide the output of the DFE 206 to the signal processor 208.

In at least one example, the signal processor 208 is configured to perform at least a portion of the signal processing on the digital IF signals resulting from a received radar frame and to transmit the results of this signal processing via terminal 210 and/or terminal 212. In at least one example, the signal processor 208 transmits the results of the signal processing to a processing unit (not shown), such as the processing unit 110 described above with respect to FIG. 1. In various examples, the results are provided from the signal processor 208 to the terminal 210 and/or the terminal 212 via a high-speed interface 214 and/or a SPI 216, respectively. In at least one example, the signal processor 208 performs a range FFT on each sequence of chirps in the received radar frame. In at least one example, the signal processor 208 also performs the Doppler FFT on results of the range FFTs.

The signal processor 208 may include any suitable processor or combination of processors. For example, the signal processor 208 may be a DSP, a microcontroller, a FFT engine, a DSP plus microcontroller processor, a FPGA, or an application specific integrated circuit (ASIC). In at least one example, the signal processor 208 is coupled to memory 218, for example, to store intermediate results of the portion of the signal processing performed on the digital IF signals in the memory 218 and/or to read instructions from the memory 218 for execution by the signal processor 208.

The memory 218, in at least one example, provides on-chip storage (e.g., a non-transitory computer readable storage medium) which may be useful, for example, to communicate data between the various components of the radar transceiver IC 200, to store software programs executed by processors on the radar transceiver IC 200, etc. The memory 218 may include any suitable combination of read-only memory (ROM) and/or random access memory (RAM) (e.g., such as static RAM). In at least one example, a direct memory access (DMA) component 220 is coupled to the memory 218 to perform data transfers from the memory 218 to the high-speed interface 214 and/or the SPI 216.

In at least one example, the SPI 216 provides an interface for communication via terminal 212 between the radar transceiver IC 200 and another device (e.g., a processing unit such as the processing unit 110). For example, the radar transceiver IC 200 may receive control information, e.g., timing and/or frequencies of chirps, output power level, triggering of monitoring functions, etc., via the SPI 216. In at least one example, the radar transceiver IC 200 may transmit test data via the SPI 216, for example, to the processing unit 110.

In at least one example, the control module 222 includes functionality to control at least a portion of the operation of the radar transceiver IC 200. The control module 222 may include, for example, a microcontroller that executes firmware to control the operation of the radar transceiver IC 200. The control may be, for example, providing data parameters to other components of the radar transceiver IC 200 and/or providing control signals to other components of the radar transceiver IC 200.

In at least one example, the programmable timing engine 224 includes functionality to receive chirp parameter values from the control module 222 for a sequence of chirps in a radar frame and to generate chirp control signals that control the transmission and reception of the chirps in a frame based on the parameter values. In some examples, the chirp parameters are defined by the radar system architecture and may include, for example, a transmitter enable parameter for indicating which transmit channels 202A-202N to enable, a chirp frequency start value, a chirp frequency slope, an analog-to-digital converter (ADC) sampling time, a ramp end time, a transmitter start time, etc.

In at least one example, the radio frequency synthesizer (RFSYNTH) 226 includes functionality to generate signals (e.g., chirps and/or chirp sequences) for transmission based on chirp control signals received from the programmable timing engine 224. In some examples, the RFSYNTH 226 includes a phase locked loop (PLL) with a voltage-controlled oscillator (VCO). In at least one example, the RFSYNTH 226 may be referred to as a local oscillator (LO).

In at least one example, the multiplexer 228 is coupled to the RFSYNTH 226 and the input buffer 230 and is configurable to select between signals received from the input buffer 230 from an external component (not shown) and signals provided by the RFSYNTH 226. In at least one example, the output buffer 232 is coupled to the multiplexer 228 and may, for example, provide signals selected by the multiplexer 228 to the input buffer of another radar transceiver IC (not shown). In at least one example, the multiplexer 228 is controlled by the control module 222 via a select signal.

In at least one example, the clean-up PLL 234 is configured to increase the frequency of the signal of an external low frequency reference clock (not shown) received by the radar transceiver IC 200 to the frequency of the RFSYNTH 226 and to filter reference clock phase noise out of the reference clock signal.

In at least one example, the I/Q modulator 236 receives the output of the multiplexer 228 (e.g., the chirps and/or sequences of chirps) and modulates the output of the multiplexer 228 based on data received from the control module 222 to generate a frequency-shifted chirps. In at least one example, the I/Q modulator 236 is further coupled to a digital-to-analog converter (DAC) 238 which may be coupled to the control module 222. In at least one example, the DAC 238 receives a signal from the control module 222 in a digital format. The DAC 238 converts its received signal to an analog value and provides the analog value to the I/Q modulator 236.

In at least one example, the I/Q modulator 236 provides signals to each transmit channel 202A-202N to cause the transmit channels 202A-202N to transmit a sequence of chirps. In at least some examples, the radar transceiver IC 200 transmits simultaneously via each of the transmit channels 202A-202N. Each of the transmit channels 202A-202N may have a frequency spin, or frequency shift, imparted on chirps transmitted by a respective transmit channel 202A-202N to facilitate separation in the Doppler domain (e.g., the creation of different spectrum bands in the Doppler domain), such as produced according to a Doppler FFT, as described elsewhere herein. For example, each transmit channel 202A-202N may transmit at a frequency of $$\omega_k = \frac{2\pi(k-a)}{(N+r)},$$

where k≥is an index value in a range of [0:N−1], corresponding to a transmitter that will be transmitting at the frequency $\omega_k$, a is a constant integer functioning as an offset, and r is a number of empty bands to be created in the Doppler domain. In at least some examples, controlling the transmit channels 202A-202N to transmit at the above frequency may cause an empty band to occur at the end of spectrum bands in the Doppler domain produced according to a Doppler FFT determined according to reflected chirps, as described elsewhere herein. In some examples, r is 1 such that the Doppler domain may include N+1 spectrum bands. In other examples, r may be any suitable value such that the Doppler domain may include N+r spectrum bands.

In at least some examples, the signal processor 208 may perform velocity disambiguation based on the empty band. For example, if a maximum unambiguous velocity determinable by the radar using a specified chirp repeat periodicity and not using DDMA according to the teachings of this description is vmax, then for the radar transceiver IC 200, using the same specified chirp repeat periodicity and using DDMA according to the teachings of this description, may have a maximum determinable unambiguous velocity of $$\frac{vmax}{N}.$$

In at least some examples, N=4 such that the maximum unambiguous velocity determinable by the radar is $$\frac{vmax}{4}.$$

If an object detected by the radar transceiver IC 200 and indicated in a reflected frame has a velocity that is less than $$\frac{vmax}{4},$$

the detected object is represented in the second, third, and fourth spectrum bands of the Doppler domain. The fifth and first spectrum bands would be empty. On the other hand, if an object has a velocity that exceeds $$\frac{vmax}{4},$$

but is less than $$\frac{3vmax}{4},$$

the detected object may be represented in third, fourth, and fifth (or first) spectrum bands of the Doppler domain. The second spectrum band would be empty. Likewise, if an object has velocity less than $$-\frac{vmax}{4},$$

but is greater than $$-\frac{3vmax}{4},$$

then the object may be represented in the fifth (or first), second, and third spectrum bands of the Doppler domain, and the fourth spectrum band may be empty. Finding the empty spectrum band (e.g., where there is no object represented) allows for determining a range of velocities at which the object may be moving. Using this information and a measured Doppler value, an estimate of the actual velocity of the detected object can be computed. In such an example, the empty spectrum band functions as a lodestone for use in estimating a true or actual velocity of the detected object based on whether the object is represented in spectrum bands before or after the empty spectrum band.

In at least some examples, the signal processor 208 may also, or alternatively, perform collision detection based on the empty band. For example, in the event of a collision, as defined above, an object detected by the radar transceiver IC 200 may be represented in each spectrum band of the Doppler domain, including the empty band. Responsive to the signal processor 208 determining that a collision has occurred with respect to an object detected by the radar transceiver IC 200, the signal processor 208 may ignore the collision-affected object and/or inform other processing components, such as the processing unit 110, to ignore the collision-affected object.

FIG. 3 shows a timing diagram 300 of transmitted radar chirps in accordance with various examples. In at least some examples, the timing diagram 300 represents chirps transmitted by the transmit channels 202A-202N of the radar transceiver IC 200 of FIG. 2. As shown in the timing diagram 300, the horizontal axis represents time and the vertical access represents frequency. For example, TX1 of the timing diagram 300 may correspond to the transmit channel 202A, TX2 of the timing diagram 300 may correspond to the transmit channel 202B, and TXN of the timing diagram 300 may correspond to the transmit channel 202N. As shown by the timing diagram 300, a frequency spin of ω is imparted to the transmit channels 202B-202N to cause a Doppler domain representation of a frame of reflected chirps, reflected by an object within a field of view of the radar system including the radar transceiver IC 200, to include spectrum bands uniquely corresponding to each of the transmit channels 202A-202N and at least one empty band, as described above herein.

Figure 4:
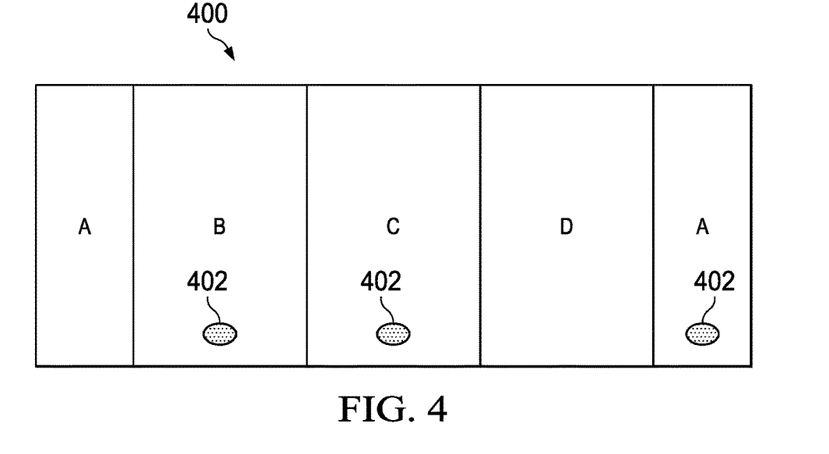
FIG. 4 shows a diagram of a Doppler domain spectrum in accordance with various examples.

FIG. 4 shows a diagram of a Doppler domain spectrum 400 in accordance with various examples. In at least some examples, the spectrum 400 is representative of an output of a Doppler FFT performed on frames of received chirps, such as by the radar transceiver IC 200 of FIG. 2. The spectrum 400 includes a band A corresponding to the transmit channel 202A, a band B corresponding to the transmit channel 202B, a band C corresponding to the transmit channel 202N, and a band D that is an empty band, as described elsewhere herein. Also shown the spectrum 400 is a representation of an object 402 detected within a field of view of the radar system including the radar transceiver IC 200. The object 402 appears in band B, band C, and band A, separated from band C by band D. In at least some examples, band D facilitates velocity disambiguation, as described above, such that via band D, spectrum 400 indicates that a velocity of the object 402 exceeds $$\frac{vmax}{3}.$$

Figure 5:
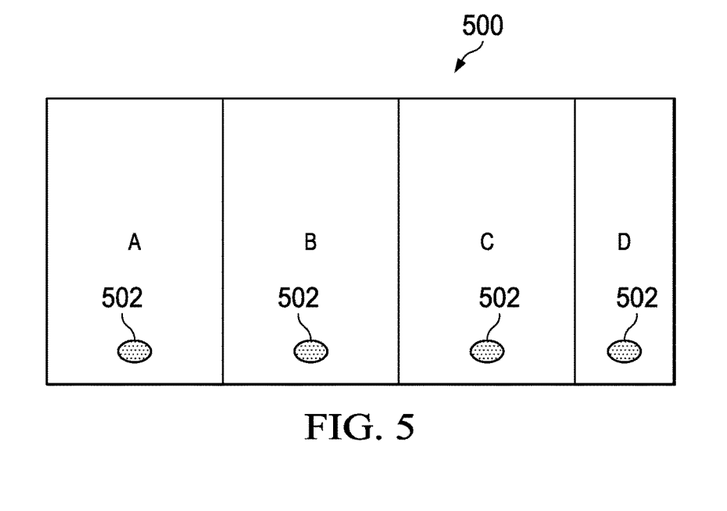
FIG. 5 shows a diagram of a Doppler domain spectrum in accordance with various examples.

FIG. 5 shows a diagram of a Doppler domain spectrum 500 in accordance with various examples. In at least some examples, the spectrum 500 is representative of an output of a Doppler FFT performed on frames of received chirps, such as by the radar transceiver IC 200 of FIG. 2. The spectrum 500 includes a band A corresponding to the transmit channel 202A, a band B corresponding to the transmit channel 202B, a band C corresponding to the transmit channel 202N, and a band D that is an empty band, as described elsewhere herein. Also shown the spectrum 500 is a representation of an object 502 detected within a field of view of the radar system including the radar transceiver IC 200. The object 502 appears in band A, band B, band C, and band D. In at least some examples, band D facilitates collision detection, as described above, such that the object 502 appearing in each of band A, band B, band C, and band D enables the signal processor 208, or another processing element such as the processing unit 110 of FIG. 1 to determine that the object 502 has been affected by a collision, as defined elsewhere herein.

Figure 6:
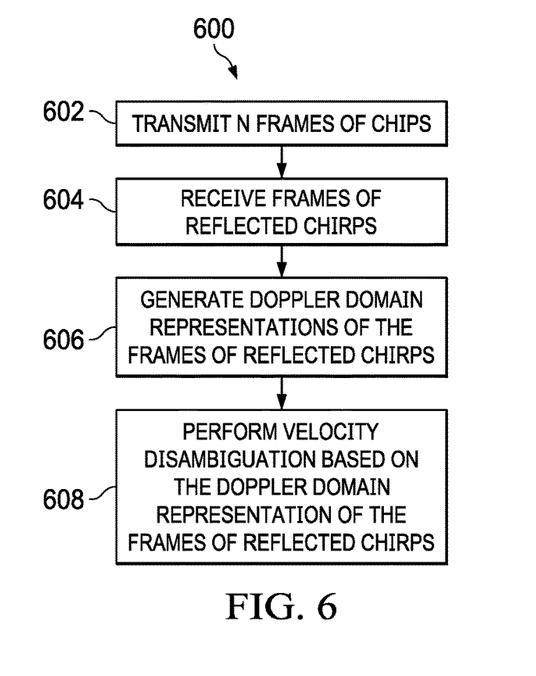
FIG. 6 shows a flowchart of a method in accordance with various examples.

FIG. 6 shows a flowchart of a method 600 in accordance with various examples. In at least some examples, the method 600 may be performed at least in part by a radar system including the radar transceiver IC 200 of FIG. 2, for example, to perform velocity disambiguation.

At operation 602, the radar system transmits N frames of chirps. In at least some examples, each frame of chirps may include multiple chirps at integer intervals of a transmission frequency of the transmitter or transmit channel, such as shown above in the timing diagram 300 of FIG. 3. In at least some examples, the transmitter transmits at a frequency of $\omega_k$, as described above herein.

At operation 604, the radar system receives frames of reflected chirps, the reflected chirps reflected by a detected object within a field of view of the radar system.

At operation 606, the radar system provides a Doppler domain representation of the frames of reflected chirps. In at least some examples, the Doppler domain representation may be provided according to any suitable means, the scope of which is not limited herein, and may include a number of spectrum bands sufficient to provide a spectrum band uniquely corresponding to each transmitter of the radar system and at least one empty band, as described elsewhere herein.

At operation 608, the radar system performs velocity disambiguation based on the Doppler domain representation of the frames of reflected chirps. A representation of the detected object may appear in multiple spectrum bands of the Doppler domain representation of the frames of reflected chirps. The radar system may determine that a velocity of the object is greater than a maximum unambiguous velocity detectable by the radar system based on a pattern with which the representation of the detected object appears in the Doppler domain representation, such as described above with respect to FIG. 4. At least partially based on the empty band, the radar system may also determine a true, or actual, velocity of the object, as described elsewhere herein.

Figure 7:
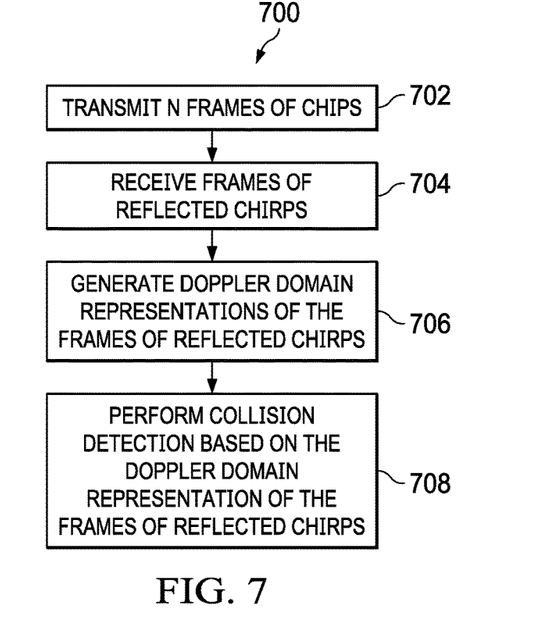
FIG. 7 shows a flowchart of a method in accordance with various examples.

FIG. 7 shows a flowchart of a method 700 in accordance with various examples. In at least some examples, the method 600 may be performed at least in part by a radar system including the radar transceiver IC 200 of FIG. 2, for example, to perform collision detection.

At operation 702, the radar system transmits multiple frames of chirps. In at least some examples, each frame of chirps may include multiple chirps at integer intervals of a transmission frequency of the transmitter or transmit channel, such as shown above in the timing diagram 300 of FIG. 3. In at least some examples, the transmitter transmits at a frequency of $\omega_k$, as described above herein.

At operation 704, the radar system receives frames of reflected chirps, the reflected chirps reflected by a detected object within a field of view of the radar system.

At operation 706, the radar system provides a Doppler domain representation of the frames of reflected chirps. In at least some examples, the Doppler domain representation may be provided according to any suitable means, the scope of which is not limited herein, and may include a number of spectrum bands sufficient to provide a spectrum band uniquely corresponding to each transmitter of the radar system and at least one empty band, as described elsewhere herein.

At operation 708, the radar system performs collision detection based on the Doppler domain representation of the frames of reflected chirps. A representation of the detected object may appear in multiple spectrum bands of the Doppler domain representation of the frames of reflected chirps. The radar system may determine that the detected object is affected by a collision, such based on a pattern with which the representation of the detected object appears in the Doppler domain representation, for example, as described above with respect to FIG. 5. For example, the radar system may determine that the detected object is affected by a collision based on the representation of the detected object appearing in each spectrum band of the Doppler domain representation of the frames of reflected chirps.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described structure either at a time of manufacture or after a time of manufacture, for example, by an end-user and/or a third-party. Unless otherwise stated, "about," "approximately," or "substantially" preceding a value means +/−10 percent of the stated value. Modifications are possible in the described examples, and other examples are possible within the scope of the claims.

What is claimed is:

1. A non-transitory processor-readable medium storing instructions executable by one or more processors in a radar system, the instructions comprising instructions for:

modulating each of a plurality of transmitters of the radar system with a corresponding phase shift that is a function of the corresponding transmitter and a number of the plurality of transmitters;

transmitting, via the plurality of transmitters, frames of chirps, wherein each transmitter of the plurality of transmitters applies the corresponding phase shift to the chirps of the frame of chirps transmitted by the corresponding transmitter;

receiving, via a receiver of the radar system, reflected signals based on the transmitted chirps having been reflected by an object within a field of view of the radar system; and determining, in a frequency domain, a Doppler representation of the reflected signals, the Doppler representation having a Doppler spectrum that includes multiple spectrum bands, wherein a relationship used to determine the phase shift of each of the plurality of transmitters is determined by $$\frac{2\pi(k-a)}{(N+r)},$$

where k is an index value identifying a corresponding transmitter transmitting the corresponding frame of chirps, N is the number of the plurality of transmitters, a is a constant integer, and r is a number of empty spectrum bands in the Doppler representation, in which the relationship is configured to cause the Doppler spectrum to include a number of spectrum bands greater than the number of the plurality of transmitters and to include at least one empty spectrum band of the multiple spectrum bands in which the object is not present.

2. The non-transitory processor-readable medium of claim 1, wherein the multiple spectrum bands include a spectrum band respectively associated with each transmitter of the plurality of transmitters and the at least one empty spectrum band is not associated with any of the plurality of transmitters.

3. The non-transitory processor-readable medium of claim 2, wherein the frame of chirps is associated with a maximum unambiguous velocity, a velocity of the object as represented in the frame of reflected chirps exceeds the maximum unambiguous velocity, and a position of the empty spectrum band in the multiple spectrum bands is used to estimate a true velocity of the object.

4. The non-transitory processor-readable medium of claim 2, wherein the object is a first object, the reflected signals include signals reflected by a second object within the field of view of the radar system.

5. The processor-readable medium of claim 1, wherein the phase shift by which the first transmitter of the plurality of transmitters is modulated with is zero.

6. A radar system, comprising:
a radar transceiver integrated circuit (IC), configured to:
transmit, via multiple transmitters, frames of chirps, each frame of chirps transmitted by a respective one of the multiple transmitters with a phase shift specific to that transmitter, each of the phase shifts for a respective one of the multiple transmitters further based on a number of the multiple transmitters;
receive reflected signals based on the transmitted chirps having been reflected by an object within a field of view of the radar system;
determine, in a frequency domain, a Doppler representation of the reflected signals, the Doppler representation having a Doppler spectrum that includes multiple spectrum bands, wherein a relationship used to determine the phase shift of each of the multiple transmitters is configured to cause the Doppler spectrum to include at least one empty spectrum band, among the multiple spectrum bands, in which the object is not present, and wherein the Doppler spectrum includes a representation of the object in a first spectrum band of the multiple spectrum bands positioned before the at least one empty spectrum band and in a second spectrum band of the multiple spectrum bands positioned after the at least one empty spectrum band; and
perform velocity disambiguation of the object based on the Doppler spectrum.

7. The radar system of claim 6, wherein each frame of chirps includes multiple chirps in which spacing between chirps is based on the phase shift applied to the corresponding transmitter of the multiple transmitters.

8. The radar system of claim 6, wherein the phase shift applied to each transmitter of the multiple transmitters is determined by $$\frac{2\pi(k-a)}{(N+r)},$$

where k is an index value identifying the transmitter of the multiple transmitters that transmits the corresponding frame of chirps, a is a constant integer, N is the number of the multiple transmitters, and r is a number of empty spectrum bands in the Doppler representation.

9. The radar system of claim 6, wherein the relationship used to determine the phase shift of each of the multiple transmitters is configured to cause the Doppler spectrum to include a number of spectrum bands greater than the number of the multiple transmitters.

10. The radar system of claim 6, wherein the radar system has a maximum unambiguous velocity that is detectable by the radar system, a velocity of the object as represented in the reflected chirps exceeds the maximum unambiguous velocity, and a position of the at least one empty spectrum band in the multiple spectrum bands is used to estimate a true velocity of the object.

11. The radar system of claim 6, wherein the inclusion of the representation of the first spectrum band positioned before the at least one empty spectrum band and in the second spectrum band positioned after the at least one empty spectrum band is responsive to a velocity of the object being greater than the maximum unambiguous velocity divided by a number of the multiple transmitters.

12. The radar system of claim 6, wherein the number of the multiple spectrum bands in the Doppler spectrum is four.

13. The radar system of claim 6, wherein the first transmitter of the multiple transmitters transmits the corresponding frame of chirps with a phase shift of zero.

14. A radar system, comprising:
a radar transceiver integrated circuit (IC), configured to:
transmit, via multiple transmitters, frames of chirps, each frame of chirps transmitted by one of the multiple transmitters with a phase shift specific to that transmitter, each of the phase shifts for a respective one of the multiple transmitters further based on a number of the multiple transmitters;
receive reflected signals based on the transmitted chirps having been reflected by an object within a field of view of the radar system;
determine, in a frequency domain, a Doppler representation of the reflected signals, the Doppler representation having a Doppler spectrum that includes multiple spectrum bands, wherein a relationship used to determine the phase shift of each of the multiple transmitters is determined by $$\frac{2\pi(k-a)}{(N+r)},$$

where k is an index value identifying a corresponding transmitter transmitting the corresponding frame of chirps, N is the number of the plurality of transmitters, q is a constant integer, and r is a number of empty spectrum bands in the Doppler representation, in which the relationship is configured to cause the Doppler spectrum to include at least one empty spectrum band; and perform collision detection of the object based on the Doppler spectrum.

15. The radar system of claim 14, wherein each frame of chirps includes multiple chirps in which spacing between chirps is based on the phase shift applied to the corresponding transmitter of the multiple transmitters.

16. The radar system of claim 14, wherein the relationship used to determine the phase shift of each of the multiple transmitters is configured to cause the Doppler spectrum to include a number of spectrum bands greater than the number of the multiple transmitters.

17. The radar system of claim 14, wherein the object is a first object, the reflected chirps comprise the chirps reflected by a second object within the field of view of the radar system, the second object has a different velocity than the first object.

18. The radar system of claim 14, wherein the first transmitter of the multiple transmitters transmits the corresponding frame of chirps with a phase shift of zero.

* * * * *